Feb. 3, 1970   J. C. ST. CLAIR   3,493,344
REVOLVING PEBBLE BED HEAT EXCHANGER
Filed Dec. 21, 1966                                            3 Sheets-Sheet 1

INVENTOR
John C. St. Clair

Feb. 3, 1970  J. C. ST. CLAIR  3,493,344
REVOLVING PEBBLE BED HEAT EXCHANGER
Filed Dec. 21, 1966  3 Sheets-Sheet 2

INVENTOR
John C. St. Clair

United States Patent Office 3,493,344
Patented Feb. 3, 1970

3,493,344
REVOLVING PEBBLE BED HEAT EXCHANGER
John C. St. Clair, Box 333, R.R. 2, London, Ohio 43140
Filed Dec. 21, 1966, Ser. No. 603,601
Int. Cl. F28c 3/18; C01b 21/32
U.S. Cl. 23—277                                6 Claims

ABSTRACT OF THE DISCLOSURE

The pebbles of a pebble bed heat exchanger (Royster pebble stove of regenerator) are placed as an annular layer covering the inside wall of a revolving, hollow and cylindrical shell of grating. The pebbles are held in place by centrifugal force. The inside of the apparatus is left hollow. Ducts are placed as needed outside the grating shell so that periodically a hot heating gas can be passed from the hollow center of the apparatus through the layer of pebbles and out through the outer ducts. At other periods of time the cold gas being heated is passed in the opposite direction of that of the heating gas through the layer of pebbles.

---

This patent relates to a heat exchanger of the regenerator type which is an improvement on the pebble bed heat exchanger or Royster pebble stove and to applications of the heat exchanger for making nitric oxide and for heating steam and other gases.

The pebble bed heat exchanger or Royster pebble stove consists of a refractory lined vessel almost full of refractory pebbles. Openings are located at the bottom of the vessel so that gases may be passed either up or down through the bed of pebbles in the vessel. For a period of usually a few minutes hot combustion gas is passed down through the pebbles heating the pebbles. Then the hot combustion gas flow is stopped and the gas to be heated is then passed up through the heated pebbles. The gas to be heated is heated and the pebbles are cooled, the pebbles losing the heat they had previously gained from the combustion gas. After a few minutes the flow of gas to be heated is stopped and the cycle is repeated continuously, alternating the flow of combustion gas and the flow of gas to be heated.

The Royster pebble stove or pebble bed heat exchanger heats gases very efficiently, the temperature to which the gases can be heated is limited only by the refractory material from which the apparatus is made.

After its discovery in the late 1930's its use for heating steam to make coal into gases for making gasolene and its use for heating and rapidly cooling air for making nitric oxide from air were thoroughly explored and the results published in many articles. In brief it can be said that the investigators found that the highly efficient heat transfer predicted by theory was found in practice. However unless very thick and expensive insulation was used heat losses through the sides and top of the vessel were very high. Also the pebbles used tended to slowly fuse together after a period of time and shrinkage cracks occurred allowing the by-passing of gases so they were not heated by the pebbles.

The research by the workers at the University of Wisconsin and their backers the Food Machinery Corp. showed that the problem of the pebbles fusing together could be solved by periodically removing the pebbles from the Royster pebble stove and lightly grinding the pebbles thus knocking them apart. However even after long and expensive research work they could not devise a cheap way of building a Royster pebble stove (pebble bed heat exchanger). The great trouble encountered by former workers is that they built the sides and top of their apparatus out of brick to stand the extremely high temperatures. This is not only expensive but if you try to cool the apparatus, for renovating the pebble bed as needed, at any other than a very slow rate the bricks will crack and expensive brick walls will have to be replaced.

The invention aims to provide an improved form of the Royster pebble stove that permits gases, particularly air and steam, to be heated cheaply to very high temperatures.

The invention also aims to provide an improved form of the Royster pebble stove which does not have brick walls and therefore can be rapidly cooled for periodic removal of the pebbles and renovating of the pebble bed.

Another aim is to provide an improved apparatus for heating gases at lower temperatures.

In the annexed drawings,

FIG. 4 may be operated with just one pebble bed heat exchanger to give an intermittent flow of heated gas.

In brief the invention comprises placing the pebbles of a Royster pebble stove as a layer covering the inside of the wall of a revolving shell of grating, the shell being preferably cylindrical. The pebbles are held in place by centrifugal force. The inside of the apparatus is left hollow. Ducts are placed as needed outside the grating shell so that desired gases can be passed through the grating, and the layer of pebbles on it, to and from the hollow center of the revolving grating shell. Gas being heated flows, when desired, inwardly from the outer ducts through the pebbles to the hollow inner center of the apparatus. During other periods hot combustion gases flow from the inner hollow center to the outer ducts to periodically reheat the pebbles.

The big advantage of the apparatus is that the pebble bed heat exchanger provides most of its own walls, a very expensive brick roof for the top of the apparatus not being needed. Such walls that are needed, as for example, for an attached chamber for burning fuel gas in air to make the hot combustion gases needed may be formed by a layer of small pebbles, which is very cheap and excellent insulation, held in place by centrifugal force to the outer rotating shell. Brick walls which are cracked and ruined, if the apparatus is rapidly heated up or cooled, are not needed.

As a result there can be built apparatus a hundred feet long with an enormous area of pebble beds for heat exchange. But of more importance the apparatus can be rapidly cooled down so that the pebbles in the heat exchanging beds can be periodically renovated to remove high temperature shrinkage cracks in the pebble beds.

Two specific uses of the invention are shown.

Figure 1:
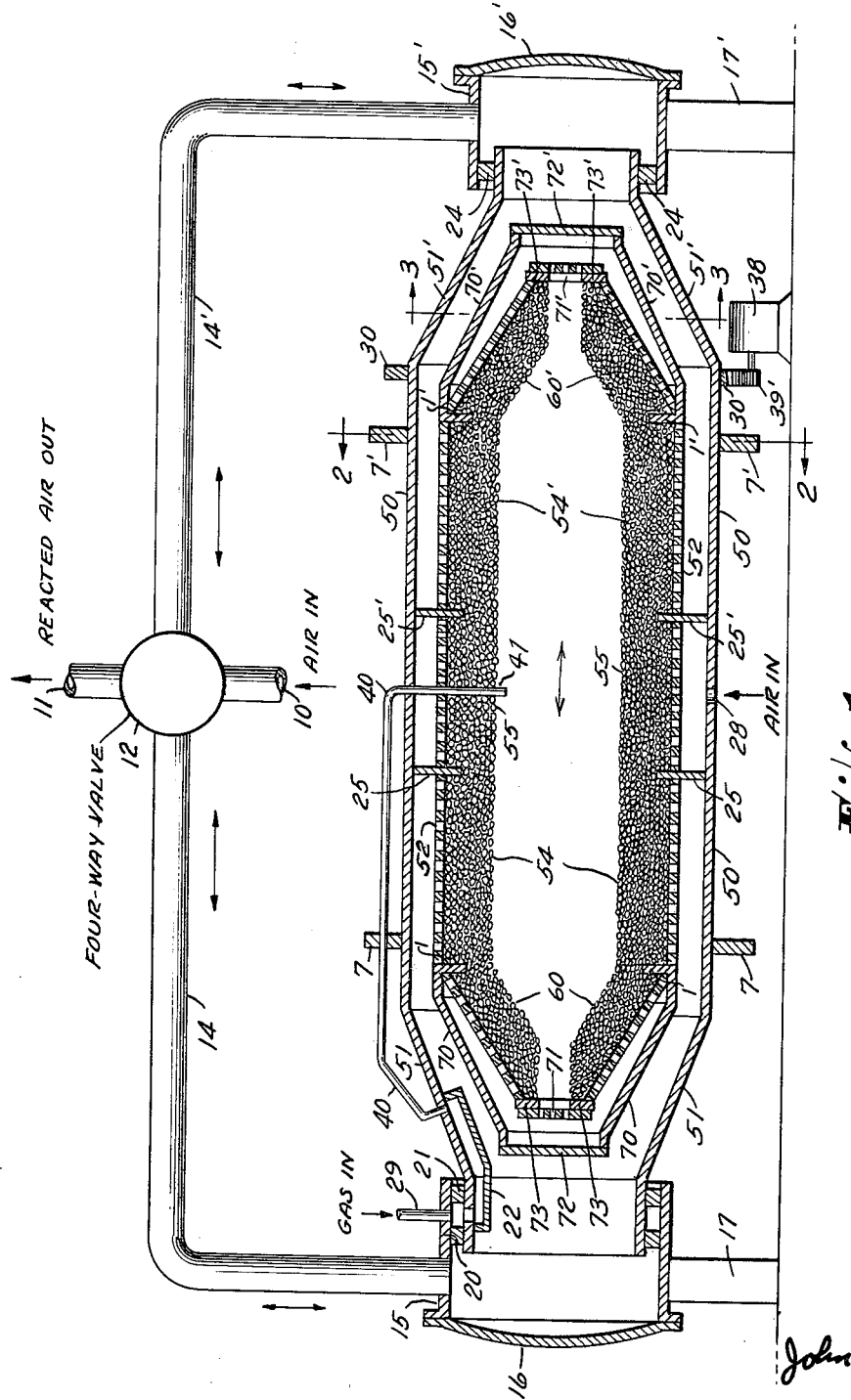
FIG. 1 is a vertical cross sectional view taken lengthwise of a form of the apparatus containing two pebble bed heat exchangers or Royster pebble stoves that may be used for making nitric oxide from the air.

In making nitric oxide from air, air is heated by passing it through a first bed of pebbles. It is further heated by burning fuel gas in the air and nitric oxide is formed. Then the air is cooled by passing it through a second bed of pebbles. Periodically the flow of air is reversed so that the first pebble bed can regain the heat it has lost and the second bed can lose the heat it has gained. In FIG. 1 I show two pebble bed layers 54 and 54' with the combustion zone 55 between them.

In gasifying powdered coal by mixing it with highly superheated steam it is frequently desired that heated steam be produced in a steady stream from a single piece of apparatus. This is done in FIG. 4 by a combustion zone at 35 (insulated by pebbles) and pebble beds A and B. Hot combustion gases formed in 35 periodically pass through and heat pebble bed A. Then at the other intervals steam is heated by passing it through pebble bed A. All the heated steam passes downwards through 97. Half of this steam passes on out 98 and serves as product. The other half is used to pass outwardly through and to heat pebble bed B. When pebble bed A is being heated by hot combustion gas, that is passed outwardly through A, and steam is not being heated by pebble bed A heated steam is supplied by passing cold steam through pebble bed B.

The following two terms used in this patent are defined as follows.

The longitudinal axis of a cylinder is the straight line joining the centers of the two ends of the cylinder.

A regenerator is an apparatus for heating a relative cool gas by heat contained in a relative hot gas in which the relative hot gas is periodically contacted against solid material which it heats and in which during other periods the relative cool gas is heated by passing this latter gas against the heated solid material, the two gases being kept substantially separate by only the fact they contact the solid material at different time intervals.

Figure 2:
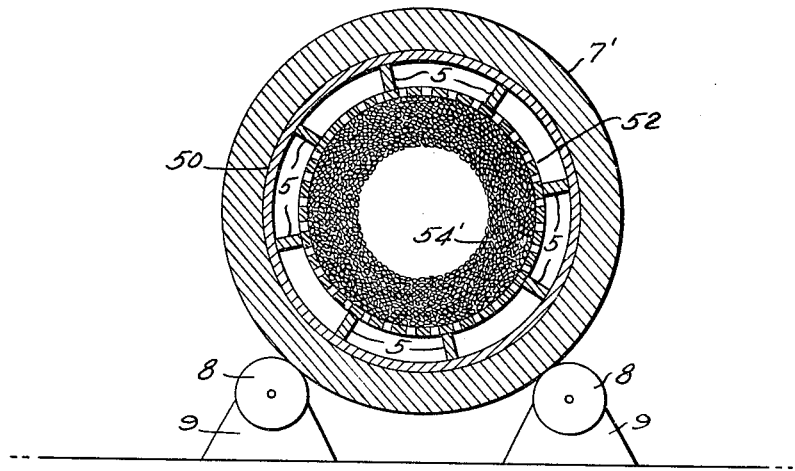
FIG. 2 is a vertical cross section on the line 2—2 of FIG. 1.

Referring to FIG. 1 (and to FIG. 2 and FIG. 3 as specifically mentioned) the apparatus has an outer metal cylindrical shell which for a specific embodiment may be 10 feet in diameter and 100 feet long although in this case a somewhat shorter shell is shown as would be used in a small plant. This shell 50 is supported like an ordinary rotary kiln by metal tires 7 and 7′, which rotate as shown in FIG. 2 on small wheels 8 rotating on shafts in stationary supports 9. Returning to FIG. 1, the shell 50 is rotated by motor 38 which drives cogged wheel 39 which meshes with cogged metal tire 30 mounted on shell 50.

Shell 50 is reduced in diameter at one end as 51 to form a gas tight rotating seal with stationary tank 15 which is supported on column 17. The rotating seal is of the split variety consisting of a bearing and a stuffing box 20 and a bearing and stuffing box 21. This construction is provided so gas (usually natural gas) can be separately admitted at 29.

Shell 50 is also reduced in diameter at the other end 51′ to form a gas tight rotating seal with stationary tank 15′ which is supported on column 17′. The rotating seal consists of a bearing and stuffing box 24.

Figure 3:
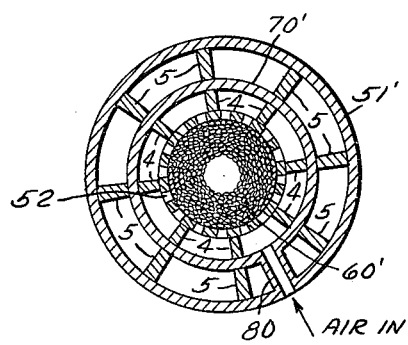
FIG. 3 is a vertical cross section on the line 3—3 of FIG. 1.

Inside and concentric with the outer shell is the pebble bed support 52 which may be considered another shell. This pebble bed support 52 is a gas permeable screen or grating and as shown in FIG. 2 (section 2—2 of FIG. 1) is fastened to bars 5 which are fastened to the outer shell 50. At the ends of the rotating outer shell, pebble support 52 is reduced in diameter and is shown in FIG. 3 (section 3—3 of FIG. 1) supported by bars 4 which are fastened to baffle 70′ which is fastened to bars 5 which are fastened to the shell 51′.

On the pebble bed support 52 lays a layer of refractory pebbles, the pebbles being held in place by centrifugal force. Then pebbles form a continuous pebble bed, lining all the inside of the apparatus except very small areas at the very ends. The pebble bed can be considered divided by very short baffles into five divisions or smaller pebble beds. In FIG. 1 the pebble bed left of baffle 1 and designated by 60 is used for insulating the end of the apparatus. The pebbles between baffles 1 and 25 and designated by 54 make up a pebble bed for passing air through for heating and cooling the air.

The pebble bed between baffles 25 and 25′ and designated by 55 is used for insulating the combustion zone where the air is finally heated by fuel gas entering at 41. The pebbles between baffles 25′ and 1′ and designated by 54′ constitute a pebble bed for passing air through for heating and cooling the air. The pebble bed to the right of baffle 1′ and designated by 60′ is used for insulating the end of the apparatus.

Discussing in detail the last mentioned pebble bed 60′ it should be realized that as the distance of a pebble from the axis around which the pebble rotates decreases the centrifugal force holding the pebble in place decreases. As a result low gas flows up through pebble bed 60′ are only possible and it is used only for insulation. Since the very ends of the inner chamber can't be insulated by pebbles (the centrifugal force at the very small diameter is too small to hold the pebbles in place), I prefer to use at 71′ a metal wire mesh plate or grating which is kept below fusion or fast corrosion temperatures by air passing through the wire mesh or grating into the hot part of the apparatus from the space between 71′ and plate 72′.

The flow of air to wire mesh plate 71′ and also to the pebble bed at 60′ enters in FIG. 3 (section 3—3 of FIG. 1) from the atmosphere by pipe line 80. The flow of air is controlled by maintaining a slight vacuum in my apparatus. However if desired the air flow may also be controlled by a control valve not shown. For pressure operation this air may be taken (not shown) from stationary tanks 15 and 15′ at alternate time intervals. At any given time one or the other tanks can provide air at a sufficiently high pressure.

It is desirable to maintain only a small cooling air flow during normal operation, but to greatly increase the flow at shut-down to allow rapid cooling of the pebbles.

To load the empty apparatus with pebbles from the center at 41 to one end, plates 16′, 72′, and 71′ are removed. Also plate 73′ which is annular in shape is removed. The shell 50 is started rotating. For a 10 foot diameter shell a velocity of two revolutions per second will give a centrifugal force of around 8 to 10 times gravity to the pebble bed in the main part of the shell. A conveyor is then inserted in the open end of my apparatus. I have found that a conveyor of up to 100 feet in length can be inserted through a 3 foot diameter hole. Pebbles are then placed in the apparatus by the conveyor which is slowly withdrawn. When the conveyor reaches a point near the end where there is danger that pebbles may fall out of the inner section of my apparatus the conveyor is stopped and completely withdrawn. Then annular plate 73′ is fastened to a shaft that is rotated at the same speed and on the same axis as the shell 50. Plate 73′ is then inserted in place in the apparatus and fastened by pushing against spring operated clamps not shown. Then plate 73′ is detached from the rotating shaft and the rotating shaft is removed.

Then a second and smaller conveyor is inserted to finish filling the pebbles near the end of the bed. Then plates 71′ and 72′ are fastened on similarly as plate 73′ was, and plate 16′ is replaced.

This procedure is repeated for the other end of the apparatus. When the apparatus is unloaded of pebbles the procedure is reversed.

The pieces of equipment at the other end and represented by unprimed numbers 16, 60, 70, 71, 72 and 73 are built identically and are used the same way as the pieces of equipment represented by the same numbers that are primed.

The center section of my apparatus (previously mentioned as between baffles 25 and 25′) is a combustion zone whereby air already heated by passage through hot pebbles is further heated by burning gas (usually natural gas) in the air. This gas enters the apparatus at 29, passes through the duct formed between baffle 22 and the shell 51, and passes by pipe line 40 to burner tip 41 from which it is ejected into the central or combustion zone of my apparatus. Burner tip 41 is preferably water cooled (not shown), the water being circulated by a small pump (not shown) to outside the shell where it is cooled in a small air cooled radiator (not shown) and is reused for cooling.

The central section or combustion zone is lined by the portion of the pebble bed designated by the numeral 55 and supported by the pebble support 52 between baffles 25 and 25'. Air cooling is provided for this section of pebbles by air entering from the atmosphere at 28. This air cooling is done only slightly during regular operation, being enough only to prevent heat from inside the apparatus from penetrating the pebble bed at 55 and heating the outer shell 50. On shut-downs the air velocity is greatly increased so as to rapidly cool the pebbles and allow rapid unloading of the pebbles from the apparatus.

In the drawing the amount of cooling air entering at 28 is shown controlled by maintaining a slight vacuum in my apparatus. However if desired the air flow may also be controlled by a control valve not shown. For pressure operation the cooling air may be taken from stationary tanks 15 and 15' at alternate time intervals. At any given time one or the other of the tanks can provide air at a sufficiently high pressure.

To illustrate the mode of operation, let us assume air enters by pipe line 10, being drawn in by a slight vacuum maintained in the apparatus, and passes into four-way valve 12 which can pass air either to pipe line 14 or to pipe line 14'. Let us assume the air is passed to pipe line 14. The air passes by pipe line 14 to stationary tank 15. Here it passes into the rotating part of my apparatus through the open ducts shown. It passes beside baffle 70, passes through pebble support 52 and through pebble bed 54, the air being heated. The air then passes through the combustion section of the apparatus which is lined by the insulating pebble bed at 55. Here the air is further heated by the burning of gas injected at 41. Nitric oxide is formed in the highly heated air.

The air, now called "reacted air" or "nitric oxide containing air," then passes through the pebble bed at 54' and the pebble support 52 under it, the nitric oxide containing air being rapidly chilled without the nitric oxide substantially decomposing to nitrogen and oxygen. (If my apparatus is operated at high pressures part of the nitric oxide will combine with oxygen to form nitrogen dioxide. This is an advantage since it makes more easy to recover the nitric oxide from the air.) The nitric oxide containing air then passes through the ducts on to the right in FIG. 1 past baffle 70' to stationary tank 15'. Here the nitric oxide containing air (or reacted air) passes by pipe line 14' to four-way valve 12 and passes out by pipe line 11 to go to an exhaust fan not shown and is processed for nitric oxide recovery in apparatus not shown.

After a short time interval, depending on how fast the rate of air flow changes the temperatures of the pebble beds, the direction of air flow is reversed. Then the pebble bed just used for heating the air, in the one half cycle just described, can regain its heat in the remaining half of the cycle by the pebble bed being used for cooling the heated gas. At the same time the pebble bed just used for cooling the heated air, in the one half cycle just described, can lose its acquired heat in the remaining half of the cycle by using this latter pebble bed for heating the incoming cold air.

In the remaining half of the cycle air flows from control valve 12 through pipe line 14' to stationary tank 15' and passes through ducts past baffle 70' to the pebble bed at 54' which it passes through and is heated. The air then passes through the combustion section which is lined by the insulating bed at 55. Here the air is further heated by the burning of gas injected at 41. Nitric oxide is formed in the highly heated air. The air, now called "reacted air" or "nitric oxide containing air," then passes through the pebble bed at 54 and the pebble bed support 52 under it, the nitric oxide containing air being rapidly chilled without the nitric oxide substantially decomposing. The nitric oxide containing air passes to the left in FIG. 1 through ducts past baffle 70 to stationary tank 15. Here the nitric oxide containing air (or reacted air) passes by pipe line 14 to four-way valve 12 and passes out by pipe line 11 to the previously mentioned exhaust fan not shown to be processed in apparatus not shown. After a short interval the air flow is again reversed and the cycle repeated.

Figure 4:
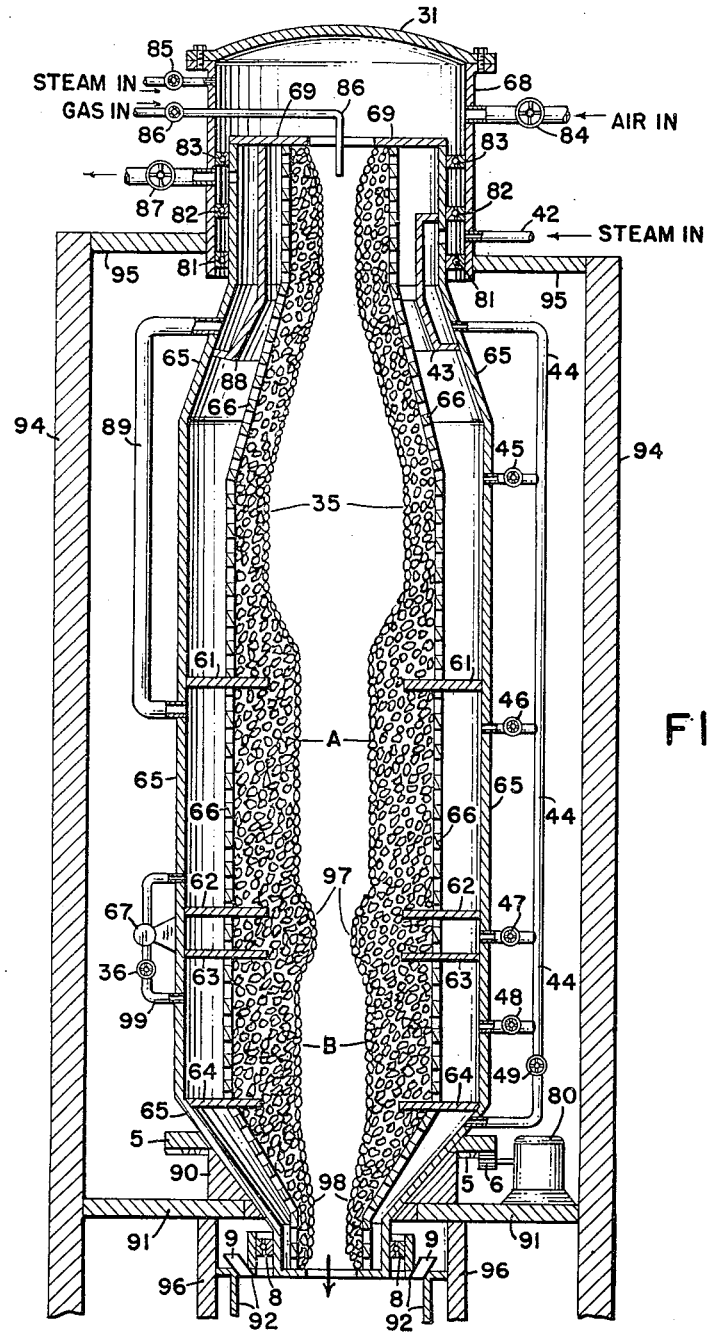
FIG. 4 is a vertical cross sectional view taken lengthwise of the apparatus containing two pebble bed heat exchangers or Royster pebble stoves that may be used to supply a continuous stream of heated steam or other gases.

I now refer to FIG. 4 which shows two of my revolving pebble bed heat exchangers used as a steam heater for coal gasification. I have an outer revolving vertical cylindrical shell at 65 which is reduced in diameter at the top and bottom ends. At the top, the outer revolving shell 65 fits into a stationary tank 68 and gas tight seals are maintained by three bearing and stuffing boxes 81, 82 and 83. Between bearing and stuffing boxes 81 and 82, steam to be heated is admitted by pipe line 42. Between bearing and stuffing boxes 82 and 83, cooled combustion gases are periodically removed by valved line 87. Stationary tank 68 is supported by beams 95 and 94.

Outer shell 65 is revolved by motor 80 which drives cogged wheel 6 meshing on cogged ring 5 fastened to outer shell 65. To support shell 65 is fastened a bearing 90 which revolves on plate 91 which is supported by supports 96 and 94. A notch in bearing 90 prevents side play.

At the bottom, outer shell 65 passes into stationary coal gasifier 92. A gas tight seal is provided by stuffing box 8. At the very bottom of outer shell 65 a small amount of metal is exposed to high temperature gases. The metal is kept from reaching too high temperatures by water jackets not shown. Inside outer shell 65 is fastened a screen of grating 66. This may be considered another vertical cylindrical shell that is reduced in diameter at the ends. Against the inner side of the grating a layer of refractory pebbles is held in place by centrifugal force. This layer of pebbles may be considered as being divided into five sections by short baffles 61, 62, 63 and 64. Above baffle 61 is a combustion zone surrounded by insulating pebble bed 35. Between baffles 61 and 62 is heat exchanging pebble bed A. Between baffles 62 and 63 is insulating pebble bed 97 which surrounds a short pipe-like cavity for conveying the heated steam from pebble bed A. Between baffles 63 and 64 is heat exchanging pebble bed B. Below baffle 64 is insulating pebble bed 98 surrounding a pipe-like cavity which conveys the heated steam to its point of use in coal gasifier 92.

The baffles 61, 62, 63 and 64 just mentioned also divide the space between outer shell 65 and grating 66 into five divisions. Each of these divisions is supplied with steam entering by pipe line 42. From pipe line 42 the steam passes between the baffle 43 and outer shell 65 to pipe line 44. From there the steam passes into the above five divisions by five very short pipe lines controlled by the five valves 45, 46, 47, 48 and 49. The steam passing through valves 46 and 48 is heated by pebble beds A and B respectively. The steam passing into the other three divisions is just very slow streams for cooling the heat that passes through the insulating pebble beds from the very hot interior. When the equipment is to be cooled down for changing the pebbles in the pebble beds, air is preferably substituted for steam and the rate of flow is made large.

To fill the apparatus with pebbles, cover 31 is removed and pipe line 86 is removed (by flanges not shown). Baffle 69 is removed, the shell 65 is started revolving and a conveyor is lowered inside. Then as the conveyor is slowly raised the pebbles are placed inside. Then baffle 69 is replaced by fastening it to a shaft rotating on the same axis and with the same velocity as shell 65 and is shoved in place, being fastened by spring clamps not shown. Then the shaft is detached from baffle 69 and removed. Then pipe line 86 is replaced (by the flanges not shown). Then cover 31 is replaced. Emptying the apparatus of pebbles is done by reversing the above procedure. That is, the cover 31 is taken off. Then pipe line 86 is taken off (from flanges not shown). Baffle 69 is taken off by connecting it to a shaft rotating on the same axis as shell 65 and rotating with the same velocity as shell 65. Baffle 69 has been mentioned as being held onto shell 65 by spring clamps not shown. By means of fastening the rotating shaft to baffle 69 the baffle 69 is pulled loose from shell 65.

Then a conveyor is lowered inside the apparatus and removes the pebbles. The conveyor is a conventional conveyor for service in which it is desired to convey granular material, as for example would also be used for coal being mined in the coal mine that supplies the coal that FIG. 4 would supply the hot steam for gasifying. (Coal gasification plants are always located beside the coal mines that furnish the coal for gasification and both are operated by the same company.) Those connected with the mining and handling of coal are very experienced with the use of conveyors but since my invention might be used by those that are not experienced with the conveying of solids the conveyor system is described more fully. However in any case those skilled in the art of this invention should be chemical or mechanical engineers and they and those not chemical or mechanical engineers are referred to the common handbooks on chemical and mechanical engineering for detailed information on the large variety of conveyors that are capable of doing the job. The simplest conveyor system would be an air conveyor operating under vacuum. That would have a flexible pipe that is lowered into the revolving apparatus by a remote controlled adjustable arm. A nozzle on the end of the flexible pipe would suck the pebbles together with much air into the flexible pipe and the flexible pipe would draw the pebbles and sucked-in-air out of the revolving apparatus. For details on air conveyors the reader is referred to Perry's Chemical Engineering Handbook, 4th Ed., 1963, pages 7–19 through 7–22.

The mode of operation of FIG. 4 is as follows. During the first part of the cycle air enters stationary tank 68 by valved line 84 and passes into the combustion chamber of the apparatus surrounded by pebble bed 35. Fuel gas is added by valved line 86. The combustion gases which are very hot pass into the cavity of the apparatus surrounded by pebble bed A, and then pass through pebble bed A heating the pebbles and cooling the combustion gases. The cooled combustion gases pass through grating 66, then through pipe line 89 to the duct between baffle 88 and outer shell 65. Then they pass out of the apparatus by valved line 87.

During the above time steam, entering the system by pipe line 42, passing through the duct between baffle 43 and outer shell 65, passing through pipe line 44 and valve 48, passes through pebble bed B which heats the steam. A slight amount of this steam then passes upwards through restriction 97. The rest of the steam passes down through the pebble-surrounded pipe line 98 into the coal gasifier 92 where coal or coke entering by pipe lines 9 is reacted with the hot steam. The first part of the cycle is continued until pebble bed A absorbs all the heat it can conveniently absorb. Then the second and remaining part of the cycle is commenced. The inlet air is stopped by closing the valve in 84. The fuel gas is stopped by closing the valve in 86. Then steam is introduced by valved line 85 to purge the system of combustion gases. The flow of steam is then continued, but at a much lower rate, to prevent heat radiating from the top of the combustion zone from overheating the metal parts of the top of the apparatus. The valve in 87 is closed. Then valve 46 is opened and steam is passed through pebble bed A which heats the steam. This heated steam flows downward through the restriction surrounded by pebble bed 97 into the cavity surrounded by pebble bed B. About half of this heated steam passes on through the pipe-like cavity surrounded by insulating pebble bed 98 into the coal gasifier. The other half of this hot steam from pebble bed A is used to heat pebble bed B as follows.

Simultaneously with the above opening of valve 46, valve 48 is closed, valve 36 is opened and fan 67 is started. In this way this other half of the hot steam from pebble bed A is circulated outwardly through pebble bed B thus heating pebble bed B and cooling the steam. The cooled steam passes by pipe line 99 through valve 36 and fan 67 back to the outside of pebble bed A through which the steam recirculates and is reheated.

As soon as much heat as can be conveniently removed is removed from pebble bed A the second part of the cycle is completed. Then operation of the first part of the cycle is recommenced.

When the final use of the heated steam is such that the flow of heated steam can be intermittent it is cheaper to just supply the heated steam in an intermittent manner.

FIG. 4 can be obviously operated to supply steam in an intermittent manner. Combustion zone 35 and pebble bed heat exchanger A would be used. Pebble bed heat exchanger B would not be used. To not use pebble heat exchanger B, valves 48 and 36 would be permanently closed.

Pebble bed heat exchanger A would be periodically heated by air, entering by 84, which burns fuel gas, entering by 86, just as it has been described when the final flow of heated steam is continuous. Just as before, when pebble bed A is sufficiently heated, combustion zone 35 and pebble bed A are purged of gases by steam from valved pipe line 85. Then valved pipe line 46 is opened and steam coming through pipe line 42, through the duct between baffle 43 and outer shell 65, and through pipe line 44 is heated by passing through pebble bed A. The heated steam, passes through 97 and 98 out of the bottom of the apparatus, to be used.

When pebble bed heat exchanger A has been cooled as much as desired by heating steam, the flow of steam is stopped by closing valved line 46. Then the whole procedure or cycle is started over again with the heating of the pebble bed heat exchanger A.

Obviously FIG. 4 may be used to heat desired gases other than steam such as pure air or carbon dioxide.

Things obvious to ones skilled in the art are not shown in the drawings. For example insulation will cut down heat losses from outer shell 65 in FIG. 4, but is not shown.

The invention has been illustrated for atmospheric pressure operation as would be normally used in small plants. However in large plants it will be frequently desired to heat gases at high pressures. The long cylindrical shape of the outer wall of the disclosed apparatus can be very easily made strong enough to stand high pressures.

However with high pressure gases it is necessary to use long heating and cooling cycles for the pebble bed heat exchangers. That is, when the pebbles are heated by the hot combustion gas they are heated a substantial amount and when the pebbles are cooled by heating the cold gas the pebbles are cooled a substantial amount. When the pebbles are heated substantially they tend to expand to some extent and if the diameter of the apparatus is small enough the pebbles may form a circular arch and exert undesirable pressures on the outer cylindrical shell. The arching of granular materials has been studied by others and from their data it is found desirable for the apparatus to have a larger diameter when high pressure gases are heated. As for example an outer shell of 20 ft. in diameter with a pebble bed 4 ft. deep won't arch under any conditions. With atmospheric operation, as illustrated in the drawings, short heating cycles can be used if necessary and expansion and arching of the pebbles is not a problem.

The big aim of the present invention is to provide a cheap way to heat gases to over 3500° F. The ability of the pebble bed heat exchanger to be rapidly cooled and the pebble bed renovated is a great advantage. This rapid cooling cannot be done with prior pebble bed heat exchangers since they require brick walls and the only brick usable at high temperatures crack and are ruined when they are cooled rapidly.

However applicant's pebble bed heat exchanger has advantages where fusion of the pebbles together is not a problem and the ability of the heat exchanger to be rapidly cooled is not an advantage.

For example applicant's invention permits the use of very small pebbles. It has long been known that very small pebbles are extremely efficient for heating gases. However in the past they have not been used since the upward flow of a gas will blow very small pebbles out of the pebble bed. However in my pebble bed heat exchanger the use of centrifugal force will prevent small pebbles from being blown out of the bed.

In my drawings I have shown my revolving pebble bed heat exchangers made in the form of hollow cylinders. Obviously this is not necessary and my pebble beds may be made in any shape as long as the pebbles are held in place by centrifugal force. For example, individual pebble beds may only extend part ways around the cylindrical outer shell but may extend most of the full length of the cylindrical outer shell.

The pebbles used in the revolving pebble bed heat exchangers are made of any convenient material that preferably tends to soften or fuse together a minimum amount at the operating temperatures. For the highest temperatures magnesia or zirconia pebbles are usually preferred. For making acetylene from natural gas I prefer pebbles of zirconium carbide.

It is desirable to make the pebbles as dense as possible which is commonly done by heating the pebbles at as hot a temperature as possible. This can be done by contacting the pebbles in a conventional rotary kiln by very hot combustion gases. The air used to form the combustion gases is preferably first preheated by one of my revolving pebble bed heat exchangers. In order to have the rotary kiln stand extremely high temperatures I recommend that the invention of W. C. Saeman, U.S. 2,878,004 be used. This is to operate a rotary kiln just fast enough so that part of the charge will be held by centrifugal force to the outer walls of the kiln, but the centrifugal force will be insufficient to hold the charge to the walls in the center of the rotary kiln. In this way the outer walls of the rotary kiln will be protected against the heat by a layer of the charge being heated.

In this patent the word refractory is used to describe solids whose properties allow them to be used at temperatures above 2000° F.

The word pebble when it has been used by others in the past in connection with pebble bed heat exchangers has been given a very broad meaning. It is commonly used to include specially formed refractory bodies such as spheres. However in the described invention it is preferred to use the irregular small bodies that can be cheaply made by crushing large masses of refractory materials.

When special shapes are used as pebbles it is obvious that special machinery can place them in a special or ordered manner in the described pebble bed. However in the invention it is preferred to very cheaply just pour or chaotically place the pebbles in the pebble beds.

Workers in the past have placed no limitations on the size of what they consider to be pebbles. For example spheres several inches in diameter have been called pebbles. F. G. Cottrell in basic patent U.S. 2,422,081 for the use of pebble bed heat exchangers for the production of nitric oxide from air places no limits on the size of pebbles that may be used. However in the present invention it is always preferred to use pebbles small enough so that they have at least 30 square feet of surface area per cubic foot or pebble bed. In many cases it is preferred to have pebbles with at least 120 square feet of surface area per cubic foot of pebble bed.

In conclusion it is said that the disclosed invention is a highly improved pebble bed heat exchanger that does not have the disadvantages of prior pebble bed heat exchangers. My revolving pebble bed heat exchanger is cheaper to build since it does not require brick walls that are expensive to build and will break if the heat exchanger is rapidly cooled. As a result my heat exchanger can be rapidly cooled to permit frequent renovation of the pebble bed. In this way my pebble bed can be used to heat gases cheaply to very high temperatures. When my pebble bed heat exchanger is used at low temperatures the use of centrifugal force upon my pebble bed allows the use of very small pebbles of very high efficiency. The use of very small pebbles is impractical in prior pebble bed heat exchangers since very small pebbles will tend to blow out of pebble beds that are not kept in place by centrifugal force.

I claim:

1. A regenerator for heating gases comprising a first chamber, a second chamber positioned within said first chamber and spaced therefrom to form an annular space between the external wall of said chamber and the internal wall of said first chamber, the walls of said second chamber being gas pervious but pebble solids impervious, a pebble bed disposed on the inner surface of said second chamber, means to rotate said second chamber at a rate sufficient to maintain the pebbles against said inner wall surface and thereby maintain a centrally disposed inner most open area within said second chamber, and a reversible valve system which by its means for reversing gas flow periodically causes gases for supplying heat to flow through means that convey the gases into the centrally disposed inner most open area within said second chamber and hence outwadly through the pebble bed, and hence through a gas pervious but pebble solids impervious wall of the second chamber, and hence into the annular space between the first chamber and the second chamber and hence out of the apparatus, the reversible valve system also being so constructed so that its means for reversing gas flow causes at other periods the gas to be heated to flow through means that convey the last mentioned gas into the annular space between the first and second chambers and hence through the gas pervious but pebble solids impervious wall of the second chamber and hence through the bed of pebbles, and hence to the centrally disposed inner most open area within said second chamber and hence out of the apparatus, the mentioned path of the gases supplying the heat and the mentioned path of the gas, which is is desired to heat, through the pebble bed being the same though the direction of travel of the two different gas streams are in opposite directions.

2. An apparatus according to claim 1 in which the pebbles present at least 30 square feet of surface area per cubic foot of volume of said pebble bed.

3. An apparatus according to claim 1 in which the pebbles present at least 120 square feet of surface area per cubic foot of volume of said pebble bed.

4. An apparatus according to claim 1 in which the pebbles are made out of refractory material.

5. An apparatus according to claim 4 in which the pebbles present at least 30 square feet of surface area per cubic foot of volume of said pebble bed.

6. An apparatus according to claim 4 in which the pebbles present at least 120 square feet of surface area per cubic foot of volume of said pebble bed.

References Cited

UNITED STATES PATENTS 2,878,004  3/1959  Saeman.
2,965,463  12/1960  Elliott _____ 48—206

JAMES H. TAYMAN, Jr., Primary Examiner

U.S. Cl. X.R.

23—163, 279; 48—206; 165—4, 8, 10, 90; 263—19, 32, 52